United States Patent [19]

Enders

[11] Patent Number: 5,700,029

[45] Date of Patent: Dec. 23, 1997

[54] AIRBAG MODULE MOUNTING BRACKET WITH BENDABLE MOUNTING ARMS

[75] Inventor: Mark L. Enders, Ogden, Utah

[73] Assignee: Morton International, Inc., Chicago, Ill.

[21] Appl. No.: 724,444

[22] Filed: Oct. 1, 1996

[51] Int. Cl.[6] .................................................. B60R 21/22
[52] U.S. Cl. ........................................ 280/728.2; 280/731
[58] Field of Search ............................... 280/731, 728.2, 280/728.1, 732, 777

[56] References Cited

U.S. PATENT DOCUMENTS

| 5,152,358 | 10/1992 | Kozuka | 280/731 |
| 5,314,203 | 5/1994 | Adams et al. | 280/728 A |
| 5,383,682 | 1/1995 | Nagata et al. | 280/731 |
| 5,507,521 | 4/1996 | Steffens, Jr. | 280/731 |
| 5,584,500 | 12/1996 | Nemoto | 280/728.2 |

Primary Examiner—Eric D. Culbreth
Attorney, Agent, or Firm—George W. Rauchfuss, Jr.; Gerald K. White

[57] ABSTRACT

An airbag module mounting bracket for mounting an airbag module within a steering wheel assembly in a vehicle. The mounting bracket includes a main body plate securable to the airbag module and defining a generally circular inflator-receiving aperture for fitting around a cylindrical airbag inflator of the airbag module, with the inflator-receiving aperture having a center point. The mounting bracket is attachable to the steering wheel at only two spaced-apart, opposing attachment points, with the attachment points positioned so that an imaginary straight line intersecting both attachment points is radially offset from the center point of the inflator-receiving aperture of the main body plate. A portion of the mounting bracket between the imaginary straight line and the center point of the inflator-receiving aperture is rigid yet bendable under torque caused by inflation of an airbag cushion in the airbag module, whereby the mounting bracket bends to allow the airbag module to rotate in order to place the inflated airbag cushion in an optimum position with respect to a vehicle driver.

20 Claims, 5 Drawing Sheets

AIRBAG MODULE MOUNTING BRACKET WITH BENDABLE MOUNTING ARMS

FIELD OF THE INVENTION

The present invention relates to an airbag module mounting bracket and, more particularly, to a mounting bracket having bendable mounting arms that bend to allow an airbag module to rotate downwardly during deployment of an airbag cushion to optimumly position the deployed airbag cushion with respect to a vehicle occupant.

BACKGROUND OF THE INVENTION

Providing means for directing an inflating airbag cushion of a driver side airbag module more downwardly into an optimum position with respect to a vehicle driver would be useful. An airbag module is employed in an automobile for protecting an occupant against injury by deploying an inflated airbag cushion to physically restrain the occupant's body when the automobile encounters a collision. A driver side airbag module is normally positioned with a hub of a steering wheel and includes an airbag inflator and an airbag cushion secured to a module baseplate and covered by a module cover. The airbag inflator inflates the airbag cushion upon receiving a signal from a remote collision sensor, and the inflating airbag cushion is deployed through at least one tear seam in the module cover. The airbag module also includes a mounting bracket for mounting the airbag module to the steering wheel.

In some existing driver side airbag modules, the module baseplate includes a sidewall extending upwardly from the baseplate and forming a rim. Locking arms having grooves or notches for engaging the rim extend from the module cover. The mounting bracket has cover clamps or retaining clips clamping two of the locking arms to the rim to secure the module cover to the baseplate. The airbag inflator, the airbag cushion and the mounting bracket are secured to the baseplate with a single set of nuts and bolts and the airbag module is mounted to a steering wheel normally with bolts attached to the mounting bracket. Such an airbag module is disclosed in U.S. Pat. No. 5,314,203.

Typically it is difficult to direct an inflating airbag cushion downwardly towards a driver in order to cover the lower portion of the steering wheel. The steering wheels upon which the airbag modules are mounted generally tilt away from the driver and face upwardly towards the ceiling of the vehicle. The airbag cushion expanding straight out of the face of the airbag module is therefore directed upwardly towards the ceiling of the vehicle. Some attempts at directing the airbag cushion downwardly have included specially shaped tear seams in the module cover, asymmetric airbag cushion designs and airbag cushion tethers. These attempts have had mixed results. It would be useful therefore to provide a driver side airbag module having means for directing an inflating airbag cushion more downwardly towards the vehicle driver.

SUMMARY OF THE INVENTION

A general object, therefore, of the present invention is to provide a new and improved airbag module.

A more specific object of the present invention is to provide a new and improved driver side airbag module.

Another object of the present invention is to provide a driver side airbag module having means for directing an inflating airbag cushion more downwardly towards the vehicle driver.

An additional object of the present invention is to provide a mounting bracket for a driver side airbag module having means for directing an inflating airbag cushion more downwardly towards the vehicle driver.

In carrying out this invention, there is provided a mounting bracket for mounting an airbag module within a steering wheel assembly in a vehicle, the airbag module having an inflatable airbag cushion and a cylindrical airbag inflator extending out of a bottom surface of the airbag module. The mounting bracket includes a main body plate securable to the bottom surface of the airbag module. The main body plate defines a generally circular inflator-receiving aperture for fitting around the cylindrical airbag inflator of the airbag module, and the inflator-receiving aperture has a center point. The mounting bracket is attachable to the steering wheel assembly at only two spaced-apart, opposing attachment points. The attachment points are positioned on the mounting bracket so that an imaginary straight line intersecting both attachment points is radially offset from the center point of the inflator-receiving aperture of the main body plate, and a portion of the mounting bracket between the imaginary straight line and the center point of the inflator-receiving aperture is rigid yet bendable under torque caused by inflation of an airbag cushion in the airbag module.

Upon inflation of an airbag cushion from an airbag module secured to the mounting bracket, inflation forces centered at the center point of the inflator-receiving aperture will create a torque about the offset imaginary straight line. The torque will cause the mounting bracket attached to the steering wheel assembly to bend and allow the airbag module to rotate to deploy the inflated airbag cushion into an optimum position with respect to a vehicle occupant.

According to one aspect of the present invention, the mounting bracket is shaped so that the imaginary straight line is also axially offset from the center point of the inflator-receiving aperture.

According to another aspect of the present invention, the mounting bracket further comprises a first bendable mounting arm and a generally opposing, second bendable mounting arm extending from an outer edge of the main body plate away from the inflator-receiving aperture. One of the two attachment points of the mounting bracket is positioned on the first attachment arm and the other of the two attachment points is positioned on the second mounting arm. The first and the second attachment arms form the portion of the mounting bracket between the imaginary attachment plane and the center point of the inflator-receiving aperture that is rigid yet bendable under torque caused by inflation of an airbag in the airbag module.

According to an additional aspect of the present invention, the first mounting arm includes a first segment extending from the outer edge of the main body plate, generally perpendicular to the main body plate, and a second segment extending from the first segment outwardly from the inflator-receiving aperture and offset from and generally parallel with the main body plate. The attachment point of the first mounting arm is located on the second segment. The second mounting arm includes a first segment extending from the outer edge of the main body plate, generally perpendicular to the main body plate, and a second segment extending from said first segment outwardly from the inflator-receiving aperture and offset from and generally parallel with the main body plate. The attachment point of the second mounting arm is located on said second segment, whereby the imaginary straight line is axially, in addition to being radially, offset from the center point of the inflator-receiving aperture.

According to a further aspect of the present invention, the outer edge of the main body plate includes a top edge, and the first and the second mounting arms are positioned so that the imaginary straight line is positioned below the center point of the inflator-receiving aperture of the main body plate.

According to still another aspect of the present invention, the outer edge of the main body plate also includes a first side edge and a second side edge. The first mounting arm extends from the first side edge, downwardly away from the top edge of the main body plate and radially outwardly from the inflator-receiving aperture, and the second mounting arm extends from the second side edge, downwardly away from the top edge of the main body plate and radially outwardly from the inflator-receiving aperture.

According to yet an additional aspect of the present invention, each attachment point of the first and the second mounting arms comprise a center point of a mounting fastener hole. According to still a further aspect of the present invention, the main body plate defines a plurality of spaced-apart assembly fastener holes surrounding the inflator-receiving aperture for securing the mounting bracket to the bottom surface of the airbag module. According to another aspect of the present invention, a cover clamp, for clamping a module cover of the airbag module, extends from the main body plate generally perpendicular to the main body plate.

An airbag module according to the present invention for mounting in a steering wheel assembly of a vehicle is also provided. The airbag module includes a module baseplate, a module cover secured to the module baseplate and an inflatable, folded airbag cushion secured to the module baseplate and contained between the module baseplate and the module cover. A cylindrical airbag inflator is secured to the module baseplate and positioned within an opening in the module baseplate with a portion of the airbag inflator defining a plurality of gas exhaust ports positioned within the airbag cushion.

The airbag module also includes a mounting bracket having a main body plate secured to the module baseplate and defining a generally circular inflator-receiving aperture fitting around the cylindrical airbag inflator. The generally circular inflator-receiving aperture has a center point, and the mounting bracket is attachable to the steering wheel assembly at only two spaced-apart, opposing attachment points. The attachment points are positioned so that an imaginary straight line intersecting both attachment points is radially offset from the center point of the inflator-receiving aperture of the main body plate. A portion of the mounting bracket between the imaginary straight line and the center point of the inflator-receiving aperture is rigid yet bendable under torque caused by inflation of the airbag cushion, whereby that portion of the mounting bracket bends upon inflation of the airbag cushion and causes the airbag module to rotate to deploy the inflated airbag cushion into an optimum position with respect to a vehicle occupant.

In summary, the present invention provides a bendable mounting bracket, and a driver side airbag module having a bendable mounting bracket, for directing an inflating airbag cushion more downwardly towards the vehicle driver. The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
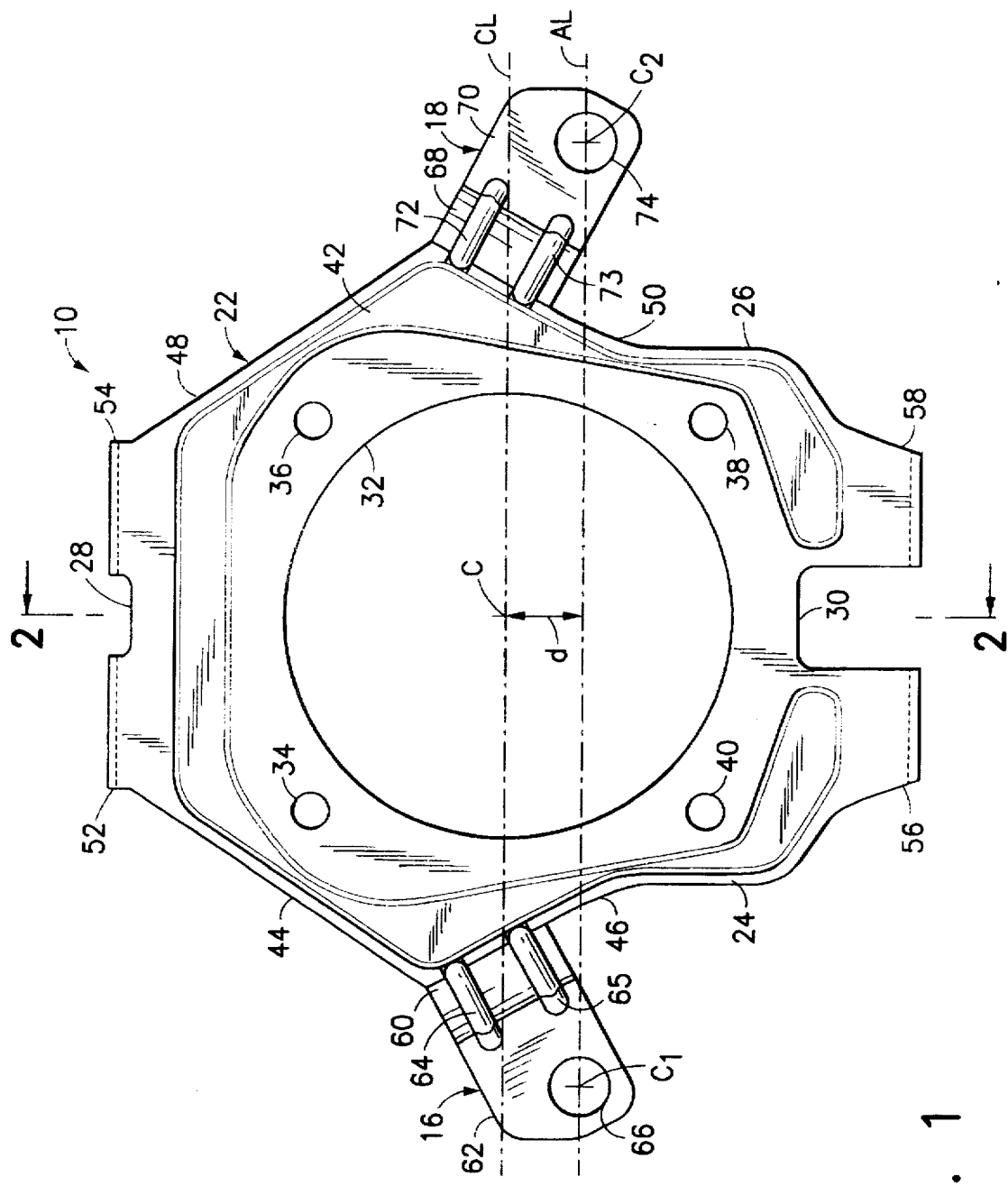
FIG. 1 is a bottom plan view of a mounting bracket according to the present invention.
Figure 3:
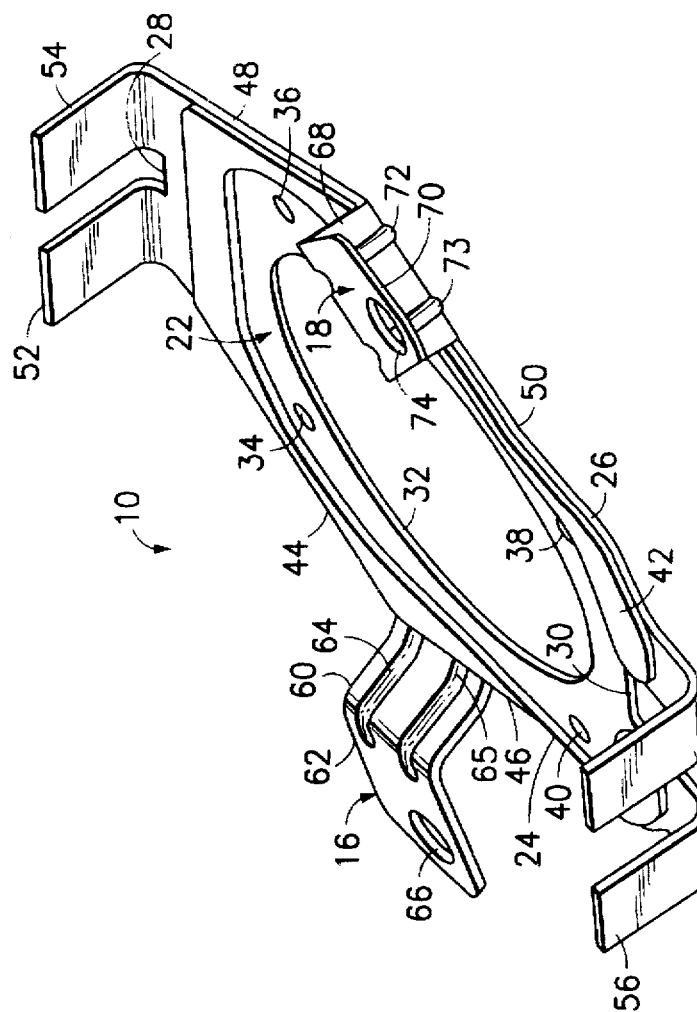
FIG. 3 is a perspective top and side view of the mounting bracket.
Figure 2:
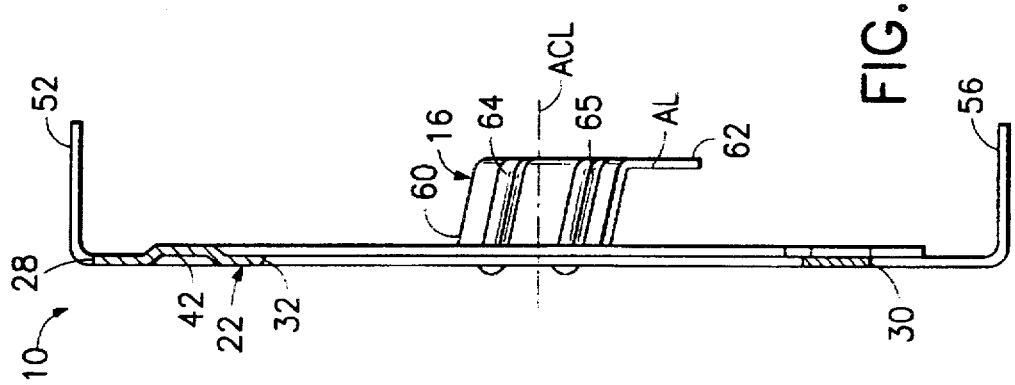
FIG. 2 is a sectional view of the mounting bracket taken along the line 2—2 of FIG. 1.

Referring to FIGS. 1 through 7, the present invention is directed to a mounting bracket 10 for mounting an airbag module 12 within a steering wheel assembly 14 in a vehicle. The airbag module 12 generally includes an inflatable airbag cushion 20 and a cylindrical airbag inflator 78 extending out of a bottom surface 84 of the airbag module. The mounting bracket 10 generally includes a main body plate 22 securable to the bottom surface 84 of the airbag module 12. The main body plate 22 defines a generally central, generally circular inflator-receiving aperture 32 for fitting around the cylindrical airbag inflator 78 of the airbag module 12, and the inflator-receiving aperture has a center point C. The mounting bracket 10 is attachable to the steering wheel assembly 14 at only two spaced-apart, opposing attachment points c1,c2, and the attachment points are positioned on the mounting bracket so that an imaginary straight line AL intersecting both attachment points is radially offset from the center point C of the inflator-receiving aperture 32. A portions 16,18 of the mounting bracket 10 between the imaginary straight line AL and the center point C of the inflator-receiving aperture 32 are rigid yet bendable under torque T caused by inflation of the airbag cushion 20 from the airbag module 12, as described in more detail below. The bendable mounting bracket 10 according to the present invention, therefore, bends to allow the airbag module 10 to rotate within the steering wheel assembly 14 and deploy the inflated airbag cushion 20 into an optimum position with respect to a vehicle occupant.

The main body plate 22 has an outer edge in the form of a first side edge 24, an opposed second side edge 26, a top edge 28 and a bottom edge 30 (the top edge and the bottom edge are shown partially with broken lines). The main body plate 22 defines a circular inflator-receiving aperture 32 having a center point C, and an imaginary center line CL is shown intersecting the center point. The imaginary center line CL is generally parallel to the imaginary straight line AL. The main body plate 22 also defines four spaced-apart assembly fastener holes 34,36,38,40 surrounding the inflator-receiving aperture 32. A substantially continuous shallow depression 42 is formed in the main body plate 22 surrounding the assembly fastener holes 34,36,38,40 and provides added strength and resistance to bending of the main body plate around the inflator-receiving aperture. The main body plate 22 is generally rectangular in shape; however, each of the first side edge 24 and the second side edge 26 includes a top section 44,48 and a mid section 46,50. The top sections 44,48, beginning at the top edge 28, slope outwardly away from the inflator-receiving aperture 32, while the mid sections 46,50 slope inwardly from the top sections. Two spaced-apart upper cover clamps 52,54 are unitary with and extend from the top edge 28 of the main body plate 22, generally perpendicular to the main body plate. Two spaced-apart lower cover clamps 56,58 are unitary with and extend from the bottom edge 30 of the main body plate 22, generally perpendicular to the main body plate.

The mounting bracket 10 includes only a first bendable mounting arm 16 and a second bendable mounting arm 18. The first and the second mounting arms 16,18 form the portion of the mounting bracket between the imaginary straight line AL and the center point C of the inflator-receiving aperture 32 that is rigid yet bendable under torque T caused by inflation of the airbag cushion 20 from the airbag module 12.

The first mounting arm 16 is unitary with and extends from the mid section 46 of the first side edge 24 of the main body plate 22. The first mounting arm 16 is generally perpendicular to the inwardly sloping mid section 46 so that the first mounting arm in effect extends downwardly away from the top edge 28 and radially outwardly from the inflator-receiving aperture 32 at an angle of about thirty degrees (30°) from the imaginary center line CL. The first mounting arm 16 includes a first segment 60 extending forwardly from the mid section 46 (forwardly with reference to facing a vehicle driver when the airbag module 12 is mounted in the steering wheel assembly 14, while backwardly means facing a dashboard from which the steering wheel assembly extends), generally perpendicular to the main body plate 22, and a second segment 62 extending from the first segment generally parallel with and offset from the main body plate. The first mounting arm 16 includes two spaced-apart, elongated strengthening ribs 64,65 primarily formed in the first segment 60, and the second segment 62 has one of the two attachment points of the mounting bracket 10 in the form of a center point c1 of a mounting fastener opening 66.

The second mounting arm 18 is generally opposed to the first mounting arm 16, and is unitary with and extends from the mid section 50 of the second side edge 26 of the main body plate 22. The second mounting arm 18 is generally perpendicular to the inwardly sloping mid section 50 so that the second mounting arm in effect extends downwardly away from the top edge 28 and radially outwardly from the inflator-receiving aperture 32 at an angle of about thirty degrees (30°) from the imaginary center line CL. The second mounting arm 18 includes a first segment 68 extending forwardly from the mid section 50, generally perpendicular to the main body plate 22, and a second segment 70 extending from the first segment generally parallel with and offset from the main body plate 22. The second mounting arm 18 includes two spaced-apart, elongated strengthening ribs 72,73 primarily formed in the first segment 68, and the second segment 70 has the other of the two attachment points of the mounting bracket 10 in the form of a center point c2 of a mounting fastener opening 74.

Because the first and the second mounting arms 16,18 extend downwardly away from the top edge 28, the imaginary straight line AL is radially offset below the center point C of the inflator-receiving aperture 32. In addition, because the two attachment points c1,c2 are positioned on second segments 62,70 of the first and the second mounting arms 16,18 which are offset from the main body plate 22, the imaginary straight line AL is also axially offset forwardly of the center point C of the inflator-receiving aperture 32.

Figure 4:
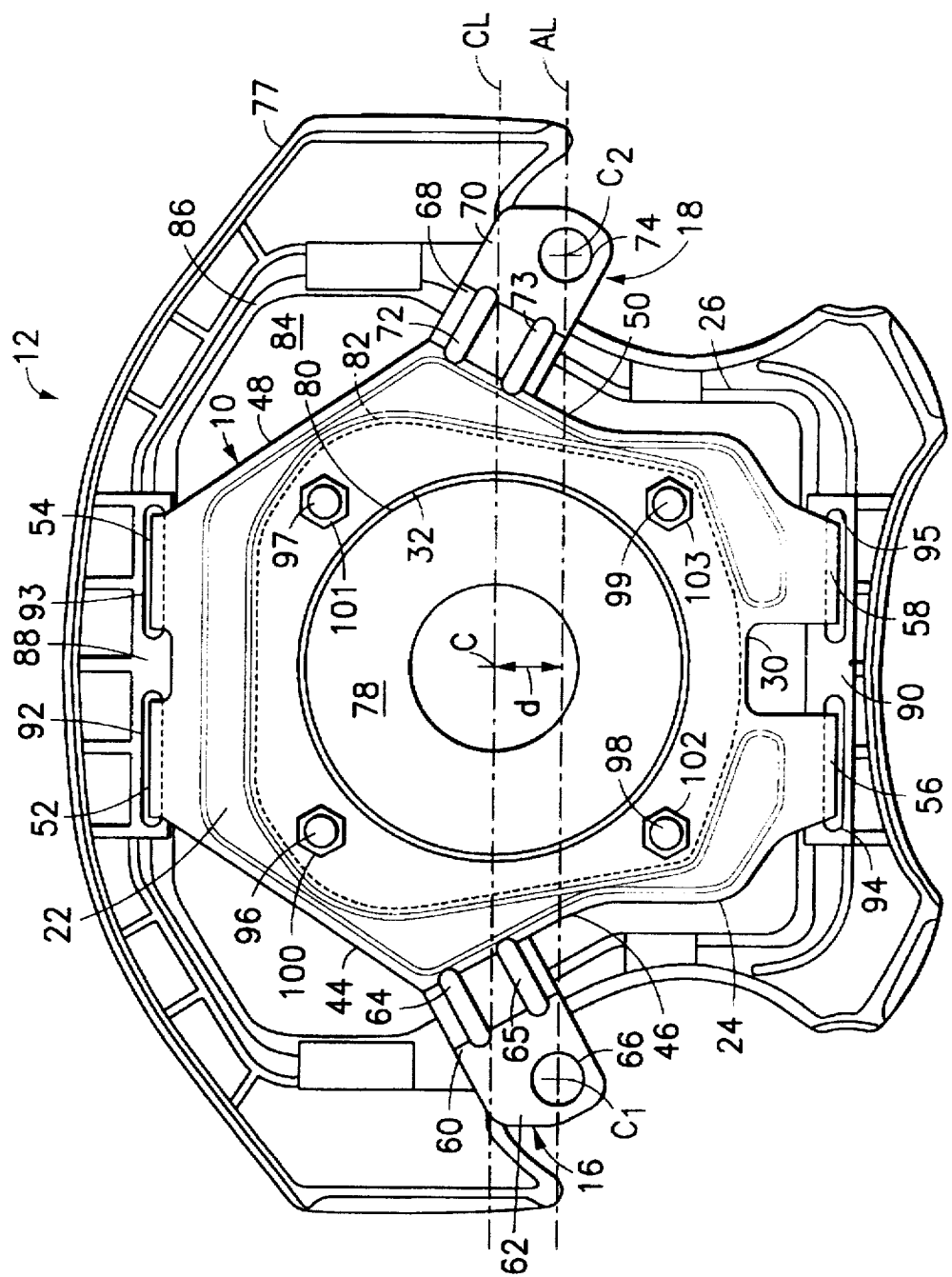
FIG. 4 is a bottom plan view of the mounting bracket secured to a driver side airbag module.
Figure 5:
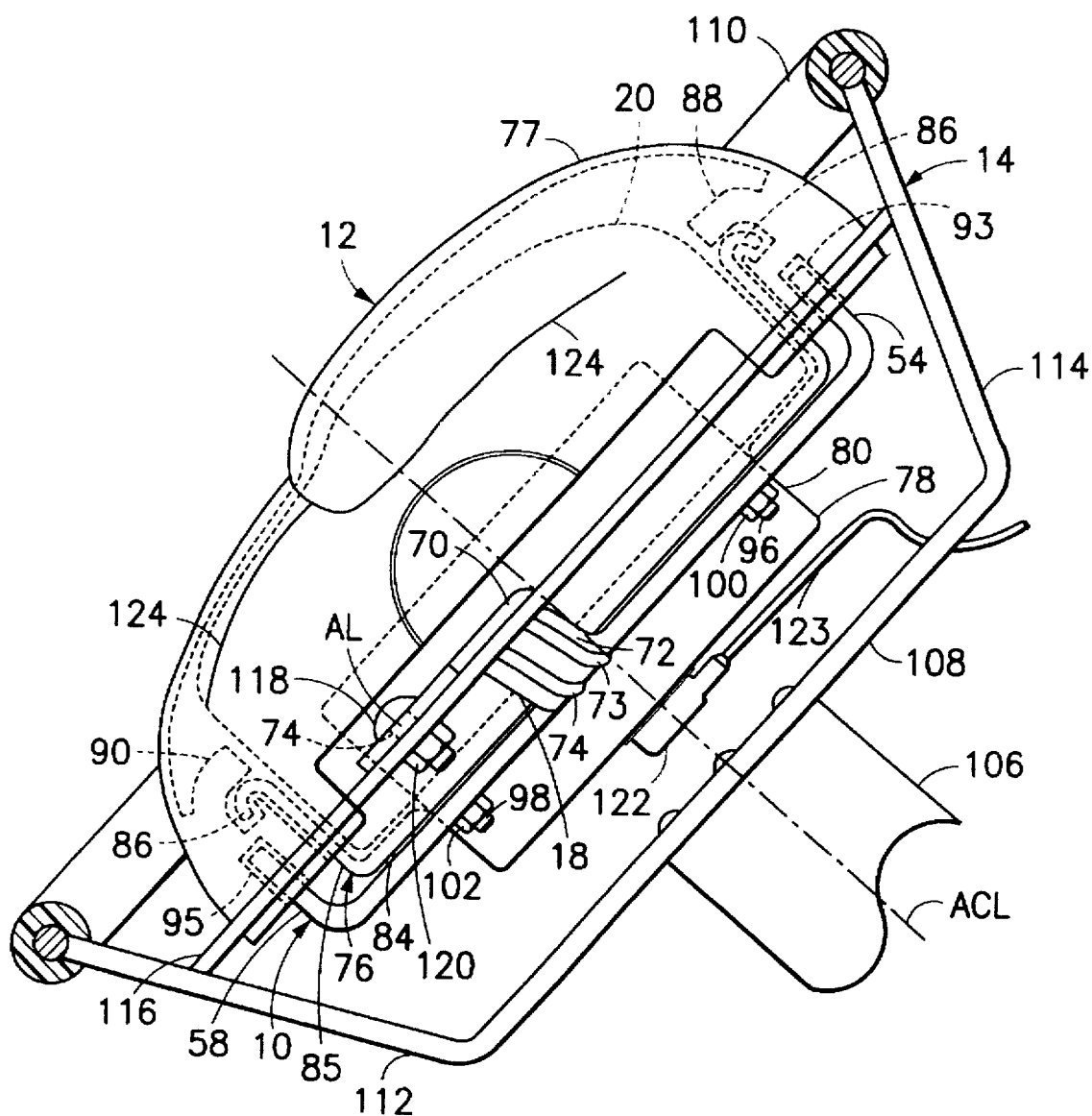
FIG. 5 is a side plan view of the driver side airbag module of FIG. 4 mounted to a steering wheel hub.

Referring to FIGS. 4 and 5, the mounting bracket 10 is shown secured to the driver side airbag module 12 which further includes a module housing 76, the airbag inflator 78, a module cover 77 and the airbag cushion 20 contained folded between the module housing and the module cover. All of these additional components are known in the art and, therefore, not described here in detail except as relating to the mounting bracket 10 according to the present invention. The airbag inflator 78 provides inflation gas for inflating the airbag cushion 20 upon being initiated by a remote collision or deceleration sensor. The airbag inflator 78 has a cylindrical sidewall 80 and an inflator flange 82 extending radially outwardly from the cylindrical sidewall. The module housing 76 includes the bottom surface of the airbag module in the form of a module baseplate 84, and the cylindrical sidewall 80 of the airbag inflator 78 extends through an opening in the module baseplate, into the module housing 76 and into the airbag cushion 20 contained therein, with the inflator flange 82 butting against the module baseplate. The module housing 76 includes a module sidewall 85 extending upwardly from the module baseplate 84 to an outwardly curled rim 86. The airbag module cover 77 includes an upper locking arm 88 engaging the rim 86 of the module housing 76 and a lower locking arm 90 engaging the rim of the module housing to secure the module cover to the module housing. The upper locking arm 88 defines two elongated slots 92,93 and the lower locking arm 90 also defines two elongated slots 94,95.

The circular inflator-receiving aperture 32 of the mounting bracket 10 fits around the cylindrical sidewall 80 of the airbag inflator 78 and the main body plate 22 clamps the inflator flange 82 against the module baseplate 84. The shallow depression 42 formed in the main body plate 22 is sized and shaped to encircle and engage an outer periphery of the inflator flange 82 to provide a more secure engagement with the airbag inflator 78. The two upper cover clamps 52,54 fit into the two slots 92,93 formed in the upper locking arm 88 of the module cover 77 to clamp the upper locking arm against the module housing 76, and the two lower cover clamps 56,58 fit into the two slots 94,95 formed in the lower locking arm 90 of the module cover to clamp the lower locking arm against the module housing to secure the module cover to the module housing.

Means for securing the airbag cushion 20, the airbag inflator 78 and the mounting bracket 10 to the module baseplate 84 includes four assembly bolts 96,97,98,99 which pass through the airbag cushion 20, the module baseplate 84, the inflator flange and the four assembly fastener holes 34,36,38,40 of the mounting bracket 10 and are fastened with four nuts 100,101,102,103 to secure the airbag module 12 as an assembled unit. It should be noted, however, that other means for securing the mounting bracket 10 to the module baseplate 84 can be provided and the mounting bracket can be secured to the module baseplate independently of the airbag cushion 20 and the airbag inflator 78 without departing from the scope and spirit of the present invention. Many variations are possible.

Figure 6:
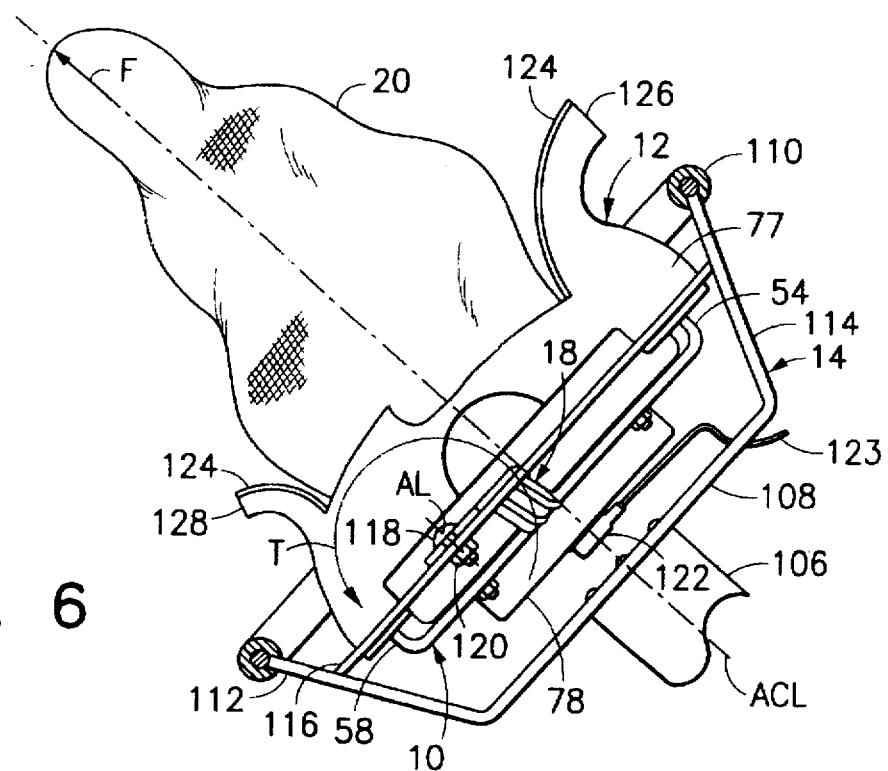
FIG. 6 is a side plan view of the driver side airbag module of FIG. 5 during deployment of an airbag cushion from the airbag module.
Figure 7:
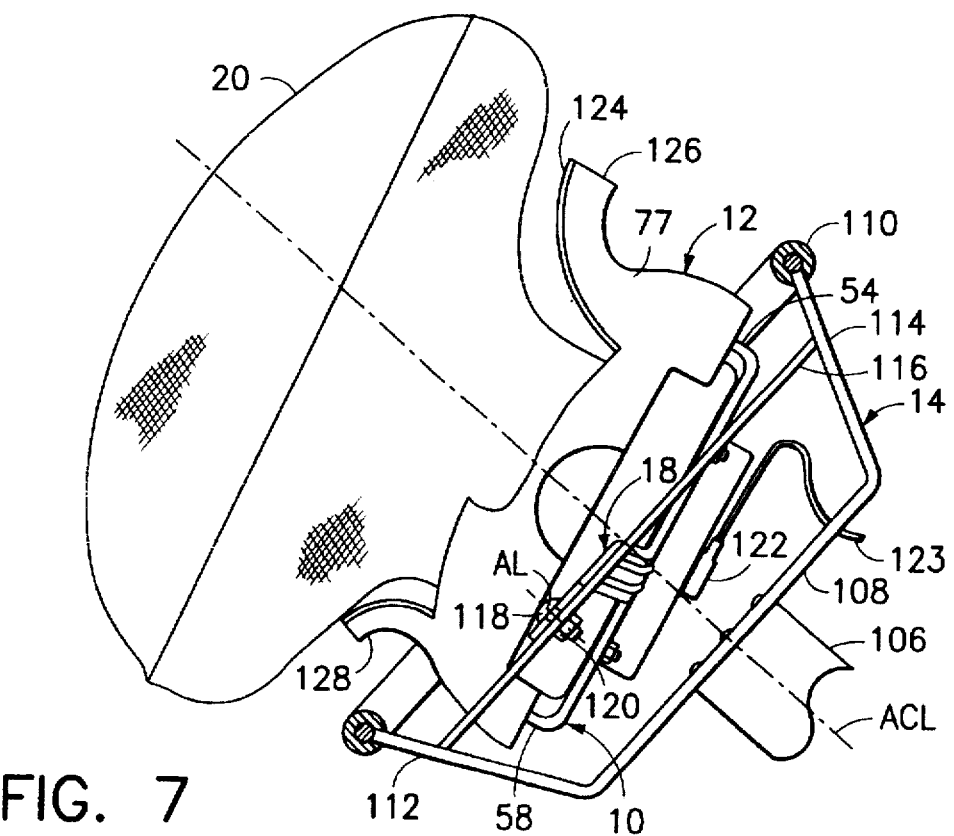
FIG. 7 is a side plan view of the driver side airbag module of FIG. 5 after deployment of the airbag cushion from the airbag module.

As shown in FIGS. 5 through 7, the airbag module 12 is mounted to the steering wheel assembly 14 using the mounting bracket 10. The steering wheel assembly 14 includes a steering column 106, a hub 108 connected to the steering column, a rim 110, spokes 112,114 connecting the rim to the hub and a frame 116 spanning between the spokes on either side of the airbag module. A mounting bolt 118 passes through the mounting fastener opening 74 of the second mounting arm 18 and through the frame 116 of the steering wheel 14 and is fastened with a nut 120 to secure the second mounting arm to the frame. Although not shown, the first mounting arm 16 is also similarly secured to the frame 116 with a nut and mounting bolt, thereby securing the airbag module 12 to the steering wheel 14. An initiator squib 122 is connected to the airbag inflator 78 and a wire 123 from the squib is connectable to a remote collision sensor.

As shown in FIG. 6, upon being initiated, due to a vehicle collision for example, the airbag inflator 78 begins to inflate the airbag cushion 20, and the inflating airbag cushion forces tear seams 124 in the module cover 77 to rupture and form doors 126,128 that open to allow the inflating airbag cushion to pass through the module cover. Before being fully inflated, the airbag cushion 20 is first rapidly ejected straight out of the front of the module cover 77 until it reaches its limit or "reaches the end of its rope". At that point the airbag cushion 20 is actually pulling on the airbag module 12 with a great deal of force F which is generally focused at the center of the airbag inflator or the center point C of the inflator-receiving aperture 32 of the mounting bracket 10. (the position of the center point C in the side plan views is indicated by an imaginary axial center line ACL) This pulling force F focused at the center point C of the inflator-receiving aperture 32 creates the torque T about the offset, imaginary straight line AL intersecting the center points c1,c2 of the fastener receiving holes 66,74 of the first and the second mounting arms 16,18.

As shown in FIG. 7, the first and the second bendable mounting arms 16,18 are bent by the torque T (although not shown, the first mounting arm bends similar to the second mounting arm) to allow the mounting bracket 10 and the secured airbag module 12 to rotate downwardly so that the fully inflated airbag cushion 20 covers more of the lower portions of the steering wheel 14 in order to provide more adequate protection to the vehicle driver. A majority of the bending occurs in the first segments 60,68 of the first and the second bendable mounting arms 16,18.

A radial distance d between the imaginary straight line AL and the center point C of the inflator-receiving aperture 32 is mostly dependent on the amount of force created by the inflating airbag cushion 20 and the strength of the first and the second attachment arms 16,18. The force created by the inflating airbag cushion 20 is mostly dependent upon the size of the airbag cushion and the size of the inflator 78, while the bending strength of the first and the second mounting arms 16,18 is dependent on the thickness of the arms, the number and size of the strengthening ribs 64,72 and the width and the length of the arms. The mounting bracket 10 is made from high strength steel and can have a thickness of about one and a half millimeters (1.5 mm) with the inflator-receiving aperture having a diameter of about ninety millimeters (90.0 mm), for example. Each of the first and the second mounting arms 16,18 can have an overall length of about fifty millimeters (50.0 mm) and a width of about twenty-five millimeters (25.0 mm), for example. The force created by the inflating airbag cushion 20 can be about two thousand pounds (2,000 lbs.), for example, and the radial distance d between the imaginary straight line AL and the center point C can be about fifteen millimeters (15.0 mm) (0.6 inches), for example, with the resulting torque T equaling about twelve hundred inch-pounds (1200 in.-lbs.).

In summary, the present invention provides simple and effective means for directing an inflating airbag cushion of a driver side airbag module more downwardly into an optimum position with respect to the vehicle driver. The bendable mounting bracket ensures that the lower portions of the steering wheel assembly are covered by the inflated airbag cushion despite whether the steering wheel assembly tilts upwardly towards the ceiling of the vehicle.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. An airbag module mounting bracket for mounting an airbag module within a steering wheel assembly in a vehicle, the airbag module having an inflatable airbag cushion and a cylindrical airbag inflator extending out of a bottom surface of the airbag module, the airbag module mounting bracket comprising:

a main body plate securable to the bottom surface of the airbag module and defining a generally circular inflator-receiving aperture for fitting around the cylindrical airbag inflator of the airbag module, the generally circular inflator-receiving aperture having a center point; and the mounting bracket attachable to the steering wheel assembly at only two spaced-apart, opposing attachment points, with the attachment points positioned so that an imaginary straight line intersecting both attachment points is radially offset from the center point of the inflator-receiving aperture of the main body plate, a portion of the mounting bracket between the imaginary straight line and the center point of the inflator-receiving aperture being rigid yet bendable under torque caused by inflation of the airbag cushion in the airbag module.

2. An airbag module mounting bracket according to claim 1 wherein the mounting bracket is shaped so that the imaginary straight line is also axially offset from the center point of the inflator-receiving aperture.

3. An airbag module mounting bracket according to claim 1 further comprising a first bendable mounting arm and a generally opposing, second bendable mounting arm extending from an outer edge of the main body plate away from the inflator-receiving aperture, with one of the two attachment points of the mounting bracket positioned on the first attachment arm and the other of the two attachment points positioned on the second mounting arm, the first and the second attachment arms forming said portion of the mounting bracket being rigid yet bendable under torque caused by inflation of an airbag in the airbag module.

4. An airbag module mounting bracket according to claim 3 wherein the imaginary straight line is also axially offset from the center point of the inflator-receiving aperture.

5. An airbag module mounting bracket according to claim 4 wherein:

the first mounting arm includes a first segment extending from the outer edge of the main body plate, generally perpendicular to the main body plate, and a second segment extending from the first segment outwardly from the inflator-receiving aperture and offset from and generally parallel with the main body plate, with the attachment point of the first mounting arm located on the second segment; and the second mounting arm includes a first segment extending from the outer edge of the main body plate, generally perpendicular to the main body plate, and a second segment extending from said first segment outwardly from the inflator-receiving aperture and offset from and generally parallel with the main body plate, with the attachment point of the second mounting arm located on said second segment.

6. An airbag module mounting bracket according to claim 5 wherein the first segment of each of the first and the second mounting arms includes at least one elongated strengthening rib.

7. An airbag module mounting bracket according to claim 3 wherein:
the outer edge of the main body plate includes a top edge; and
the first and the second mounting arms are positioned so that the imaginary straight line is positioned below the center point of the inflator-receiving aperture of the main body plate.

8. An airbag module mounting bracket according to claim 7 wherein:
the outer edge of the main body plate also includes a first side edge and a second side edge;
the first mounting arm extends from the first side edge, downwardly away from the top edge of the main body plate and radially outwardly from the inflator-receiving aperture; and
the second mounting arm extends from the second side edge, downwardly away from the top edge of the main body plate and radially outwardly from the inflator-receiving aperture.

9. An airbag module mounting bracket according to claim 3 wherein each attachment point of the first and the second mounting arms comprise a center point of a mounting fastener hole.

10. An airbag module mounting bracket according to claim 3 wherein each of the first and the second mounting arms includes at least one elongated strengthening rib.

11. An airbag module mounting bracket according to claim 1 wherein the main body plate defines a plurality of spaced-apart assembly fastener holes surrounding the inflator-receiving aperture for securing the mounting bracket to the bottom surface of the airbag module.

12. An airbag module mounting bracket according to claim 1 wherein a cover clamp, for clamping a module cover of the airbag module, extends from the main body plate generally perpendicular to the main body plate.

13. An airbag module mounting bracket according to claim 1 wherein the main body plate defines a substantially continuous shallow depression encircling the inflator-receiving aperture between the two attachment points.

14. An airbag module for mounting in a steering wheel assembly of a vehicle, the airbag module comprising:
A) a module baseplate;
B) a module cover secured to the module baseplate;
C) an inflatable, folded airbag cushion secured to the module baseplate and contained between the module baseplate and the module cover;
D) a cylindrical airbag inflator secured to the module baseplate and positioned within an opening in the module baseplate with a portion of the airbag inflator defining a plurality of gas exhaust ports positioned within the airbag cushion; and
E) a mounting bracket including,
a main body plate secured to the module baseplate and defining a generally circular inflator-receiving aperture fitting around the cylindrical airbag inflator, the generally circular inflator-receiving aperture having a center point, and
the mounting bracket attachable to the steering wheel assembly at only two spaced-apart, opposing attachment points, with the attachment points positioned so that an imaginary straight line intersecting both attachment points is radially offset from the center point of the inflator-receiving aperture of the main body plate, a portion of the mounting bracket between the imaginary straight line and the center point of the inflator-receiving aperture being rigid yet bendable under torque caused by inflation of the airbag cushion.

15. An airbag module according to claim 14 wherein the mounting bracket is shaped so that the imaginary straight line is also axially offset from the center point of the inflator-receiving aperture.

16. An airbag module according to claim 14 wherein the mounting bracket further includes a first bendable mounting arm and a generally opposing, second bendable mounting arm extending from an outer edge of the main body plate away from the inflator-receiving aperture, with one of the two attachment points of the mounting bracket positioned on the first attachment arm and the other of the two attachment points positioned on the second mounting arm, the first and the second attachment arms forming said portion of the mounting bracket being rigid yet bendable under torque caused by inflation of an airbag in the airbag module.

17. An airbag module according to claim 16 wherein the imaginary straight line of the mounting bracket is also axially offset from the center point of the inflator-receiving aperture.

18. An airbag module according to claim 17 wherein:
the first mounting arm of the mounting bracket includes a first segment extending from the outer edge of the main body plate, generally perpendicular to the main body plate, and a second segment extending from the first segment outwardly from the inflator-receiving aperture and offset from and generally parallel with the main body plate, with the attachment point of the first mounting arm located on the second segment; and
the second mounting arm of the mounting bracket includes a first segment extending from the outer edge of the main body plate, generally perpendicular to the main body plate, and a second segment extending from said first segment outwardly from the inflator-receiving aperture and offset from and generally parallel with the main body plate, with the attachment point of the second mounting arm located on said second segment.

19. An airbag module according to claim 14 wherein:
the outer edge of the main body plate of the mounting bracket includes a top edge; and
the first and the second mounting arms of the mounting bracket are positioned so that the imaginary straight line is positioned below the center point of the inflator-receiving aperture of the main body plate.

20. An airbag module according to claim 19 wherein:
the outer edge of the main body plate of the mounting bracket also includes a first side edge and a second side edge;
the first mounting arm of the mounting bracket extends from the first side edge, downwardly away from the top edge of the main body plate and radially outwardly from the inflator-receiving aperture; and
the second mounting arm of the mounting bracket extends from the second side edge, downwardly away from the top edge of the main body plate and radially outwardly from the inflator-receiving aperture.

* * * * *